(12) United States Patent
Skoglund

(10) Patent No.: US 6,311,711 B1
(45) Date of Patent: Nov. 6, 2001

(54) METHOD OF REGULATING THE LEVEL IN A BUFFER TANK

(75) Inventor: Tomas Skoglund, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/380,152

(22) PCT Filed: Feb. 25, 1998

(86) PCT No.: PCT/SE98/00337

§ 371 Date: Nov. 1, 1999

§ 102(e) Date: Nov. 1, 1999

(87) PCT Pub. No.: WO98/38556

PCT Pub. Date: Sep. 3, 1998

(30) Foreign Application Priority Data

Feb. 27, 1997 (SE) ................................. 9700707

(51) Int. Cl.⁷ ........................................... G05D 9/12
(52) U.S. Cl. ............................. 137/2; 137/386; 137/558
(58) Field of Search .................... 137/558, 386, 137/393, 391, 2

(56) References Cited

U.S. PATENT DOCUMENTS

| 4,522,228 | 6/1985 | Campau . | |
|---|---|---|---|
| 6,026,837 | * 2/2000 | Chen | 137/558 X |

* cited by examiner

Primary Examiner—Kevin Lee
(74) Attorney, Agent, or Firm—Burns, Doane, Swecker & Mathis, L.L.P.

(57) ABSTRACT

The disclosure relates to a method of regulating the level in a buffer tank (4). By means of conduits (2, 6), the tank (4) is connected to different parts in or peripheral to a process (1). There is an inflow $F_1$ in the incoming conduit (2) and an outflow $F_2$ in the outgoing conduit (6). The method comprises periodic measurements of the inflow $F_1$ and also of the level L of the product which is held in the tank (4). The method also encompasses calculated and indicated level norm values which are indicated such that the level norm value is high when the outflow $F_2$ out of the tank (4) is slight and the level norm value is low when the outflow $F_2$ out of the tank (4) is great.

7 Claims, 1 Drawing Sheet

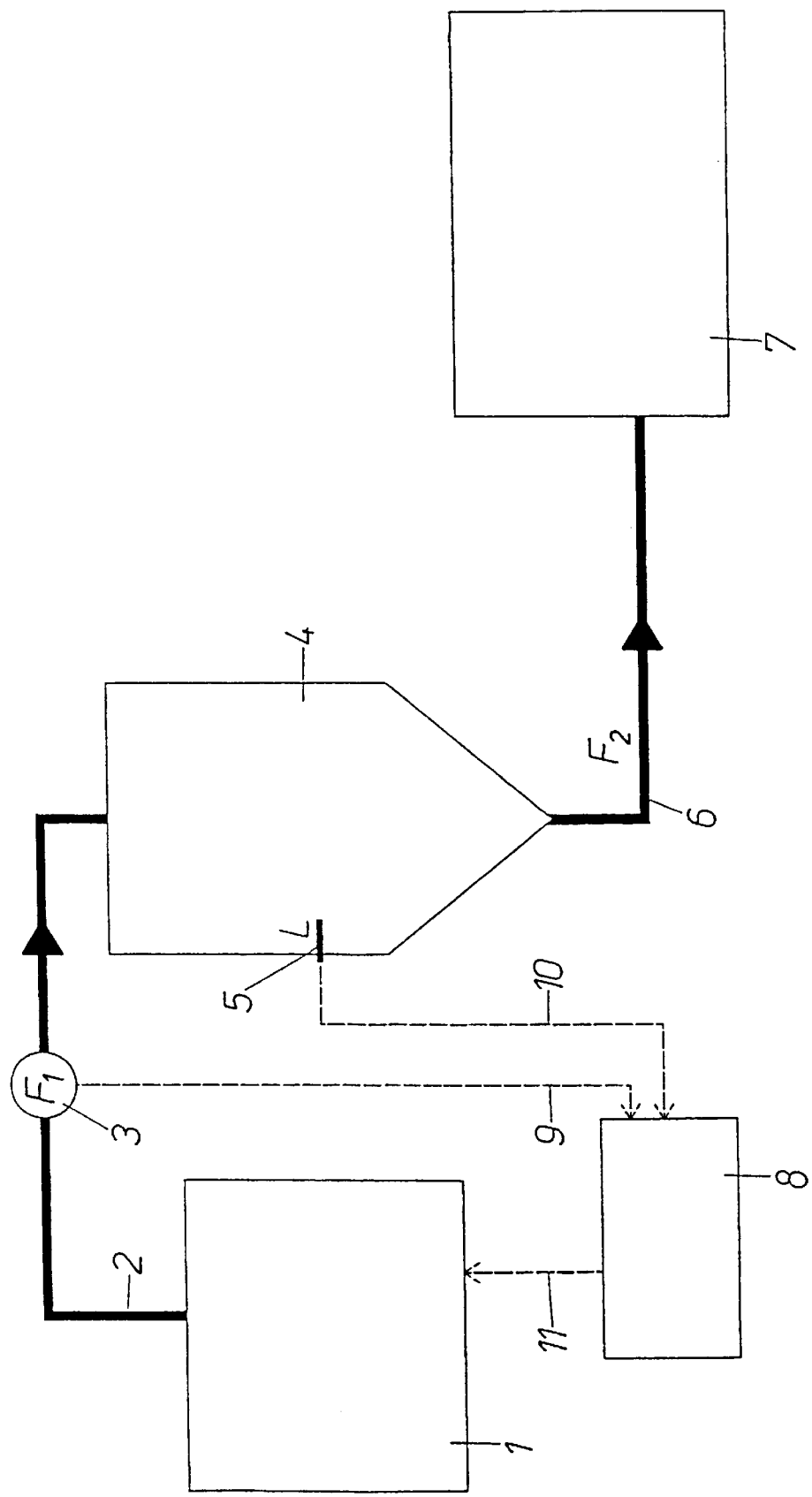

METHOD OF REGULATING THE LEVEL IN A BUFFER TANK

TECHNICAL FIELD

The present invention relates to a method of regulating the level in buffer tank, the tank being connected to conduits for inflow $F_1$ and outflow $F_2$, respectively, the method comprising periodic measurement and regulation of the inflow $F_1$ into the tank and periodic measurement of the product level L in the tank, as well as indicated level norm values.

BACKGROUND ART

Buffer tanks occur regularly within different process industries for creating a margin between the different parts in the process or between the process proper and, for example, pre-treatment or final packing. Buffer tanks are dimensioned to capable of receiving product if a disruption were to occur between the different parts in or peripheral to the process. The buffer tank is to afford space to be able to regulate one part of, for example, the process if another part in or peripheral to the process were suddenly to stop or change the flow by other means. The buffer tank should be of such dimensions as to accommodate that product volume which is required before regulation could take place. The buffer tank must also retain such a large product volume that there is no risk of it being emptied before regulation can be put into effect. If too small a tank is selected, the product may spill over and thereby be lost, or the tank may be emptied and thereby impede or disrupt the outflow. At the same time, the intention is that the buffer tank should be as little as possible, since large tanks are expensive and bulky.

A simple method of regulating the level in a buffer tank is the so-called on/off regulation method, which implies that the level is regulated in that the inflow is started or stopped when necessary. This is often an unsuitable method, since it inevitably disrupts the process.

Another common method for regulating the level in a buffer tank is by selecting a tank which is so large that a normal position for product level is situated approximately in the centre of the tank. Then there is space for regulating both upwards and downwards in the tank and the dimensions of the tank are twice the requisite space in order to have time to regulate the process.

Apart from the fact that a large tank involves considerable overhead costs and that it requires a large floor space, it also holds a larger quantity of product which runs the risk of being left standing in the buffer tank. Many products in the food industry are today highly specialised and are relatively expensive to produce, which is a further factor guiding the wish to employ as small buffer tanks as possible.

OBJECTS OF THE INVENTION

One object of the present invention is to create a method of regulating the level in a buffer tank which makes for the employment of a tank which is only half as large as those tanks which are normally employed as buffer tanks.

A further object of the present invention is that only the inflow into the tank and the level in the tank are measured.

Yet a further object of the present invention is that the method be reliable and dependable such that the process quality is not jeopardised.

SOLUTION

These and other objects have been attained according to the present invention in that the method of the type described by way of introduction has been given the characterizing feature that the level norm values for the tank are disclosed such that the level norm value is high when the outflow $F_2$ from the tank is slight and that the level norm value is low when the outflow $F_2$ from the tank is large.

Preferred embodiments of the present invention have further been given the characterizing features as set forth in the appended subclaims.

BRIEF DESCRIPTION OF THE ACCOMPANYING DRAWING

One preferred embodiment of the method according to the present invention will now be described in greater detail hereinbelow with reference to the accompanying Drawing, in which the FIGURE shows a flow diagram in which the method according to the present invention may be employed.

DESCRIPTION OF PREFERRED EMBODIMENT

The Drawing shows a process 1 which may be mixing process or the like where great accuracy is required in order to maintain a uniform product quality. From the process 1, a conduit 2 departs with the flow $F_1$, this flow being periodically measured using a conventional flowmeter 3. The flow $F_1$ must be regulated such that it is altered relatively slowly so as not to disrupt the process 1.

The conduit 2 is connected to a buffer tank 4 in which the flow $F_1$ constitutes the flow $F_1$ into the tank 4. In the tank 4, the level L of the enclosed product is periodically measured with the aid of a conventional level gauge 5. The tank 4 is further connected to a conduit 6 for the outflow $F_2$ out of the tank 4.

The conduit 6 leads the product on to further treatment, such as, for example, packing the product, which may be put into effect in one or more filling machines 7. Reference numeral 7 in the drawing may also, for instance, symbolise a sterilizer.

The process 1 is controlled with the aid of a PLC unit 8 (Programmable Logic Controller). The PLC unit 8 periodically reads off a signal 9 from the flowmeter 3. The measurement of the level in the tank 4 also gives an input signal 10 to the PLC unit 8, which this reads off periodically. From the PLC unit 8, one or more signals 11 are emitted to conventional control valves in the process 1 where, in turn, they act on and control the process 1.

In order to maintain a high product quality, the process 1 has an inherent inertia so that a signal for change of the flow of the process 1 may only be implemented such that the process is changed relatively slowly. Aftertreatment, which in the drawing consists of one or more filling machines 7, may start and stop independently of one another almost instantaneously.

The buffer tank 4 thus constitutes the margin between, on the one hand, the process 1 which can only be regulated relatively slowly and, on the other hand, the filling machines 7 with considerably quicker stop and start capabilities. The flow $F_1$ into the tank 4 may thus only be regulated slowly so as not to disrupt the process 1. The flow $F_2$ out of the tank 4 may, on the other hand, vary rapidly. From the periodically measured values of the flow $F_1$ and the level L, the flow $F_2$ is calculated. All regulation of the flow $F_1$ strives to attain the situation that the two flows $F_1$ and $F_2$ are to be equal.

The level L of product in the tank 4 is employed to maintain a desired norm value of the level L. The norm values are calculated and are indicated such that, when the outflow $F_2$ out of the tank 4 is slight the norm value is high, since the greatest change that can take place is that the outflow $F_2$ increases and thereby the need for a large buffer volume before the inflow $F_1$ has had time to increase. Conversely, the norm value is indicated such that it is low when the outflow $F_2$ is high, since the greatest change that can take place in this situation is that the outflow $F_2$ is reduced.

The level norm values should lie between 9–95% of the available volume of the tank 4. By the regulation volume constituting the greater part of the volume of the buffer tank, it is thus possible to dimension the buffer tank 4 to a volume which is roughly half of conventionally calculated buffer tanks 4.

The measurements of the inflow $F_1$ and the level L of the tank take place periodically, 1–60 times per minute. A suitable periodicity could be 4 times per minute, which would most generally give a sufficient time to be able to regulate the inflow $F_1$ into the tank 4 if the outflow $F_2$ were suddenly to change.

The above-described method of regulating the level in a buffer tank 4 may also be employed for systems with a process 1 downstream which is sensitive to rapid flow changes which may occur upstream in the system.

As will have been apparent from the foregoing description, the present invention realises a method of regulating the level of a buffer tank 4 which, while maintaining the quality of the process 1, may be put into effect rapidly and reliably. The method also allows the volume of the buffer tank 4 to be reduced to half of that required by conventional methods.

The present invention should not be considered as restricted to that described above and shown on the Drawing, many modifications being conceivable without departing from the scope of the appended Claims.

What is claimed is:

1. A method of regulating the level in a buffer tank, said tank being connected to conduits for inflow and outflow, respectively, the method comprising periodic measurement and regulation of the inflow into the tank and periodic measurement of the product level in the tank and also indicated level norm values, wherein the level norm values for the tank are indicated such that the norm value is high when the outflow from the tank is smaller than the inflow into the buffer tank and the norm value is low when the outflow from the tank is greater than the inflow into the buffer tank.

2. The method as claimed in claim 1, wherein the norm values lie between 5 and 95% of the volume of the tank.

3. The method as claimed in claim 1, wherein the periodic measurements of the inflow and the level are made 1–60 times per minute.

4. A method of regulating a product level in a buffer tank, comprising the steps of:

connecting the buffer tank to a first conduit for inflow of product and a second conduit for outflow of product;

taking periodic measurements of the inflow of product into the buffer tank and the product level in the buffer tank;

calculating the outflow from the periodic measurements of the inflow into the buffer tank and the product level in the buffer tank; and regulating the inflow of product into the buffer tank by comparing the inflow measurement to the calculated outflow.

5. The method as claimed in claim 4, wherein the inflow is decreased when the outflow from the buffer tank is smaller than the inflow measurement.

6. The method as claimed in claim 4, wherein the inflow is increased when the outflow from the buffer tank is greater than the inflow measurement.

7. The method as claimed in claim 4, wherein the periodic measurements of the inflow are made 1–60 times per minute.

* * * * *